United States Patent
Hüttenhofer et al.

[11] Patent Number: 5,820,832
[45] Date of Patent: Oct. 13, 1998

[54] PLATE-TYPE CATALYTIC CONVERTER

[75] Inventors: Klaus Hüttenhofer, Heroldsberg; Josef-Konrad Beer, Forchheim; Heimo Friede, Erlangen; Hendrik Lammers, Nürnberg, all of Germany

[73] Assignee: Siemens Aktiengesellschaft, Munich, Germany

[21] Appl. No.: 857,968

[22] Filed: May 16, 1997

Related U.S. Application Data

[63] Continuation of Ser. No. 557,413, filed as PCT/DE94/00476, Apr. 29, 1994, abandoned.

[30] Foreign Application Priority Data

May 13, 1993 [DE] Germany .......................... 43 16 131.6
May 13, 1993 [DE] Germany .......................... 43 16 132.4

[51] Int. Cl.⁶ .................................................. B01D 50/00
[52] U.S. Cl. .......................... 422/171; 422/176; 422/177; 422/180; 428/593; 428/595; 60/302
[58] Field of Search ................................... 422/171, 180, 422/211, 222, 176, 177; 502/439, 527; 428/593, 595; 60/296, 302

[56] References Cited

U.S. PATENT DOCUMENTS

| | | |
|---|---|---|
| 3,839,535 | 10/1974 | Ashburn . |
| 4,942,020 | 7/1990 | Whittenberger et al. ................ 422/180 |
| 4,987,034 | 1/1991 | Hitachi et al. ............................ 420/180 |
| 5,118,475 | 6/1992 | Cornelison ............................... 422/177 |
| 5,384,099 | 1/1995 | Sheller ..................................... 422/222 |
| 5,460,790 | 10/1995 | Shustorovich et al. ................. 422/177 |

FOREIGN PATENT DOCUMENTS

| | | |
|---|---|---|
| 0 186 801 | 7/1986 | European Pat. Off. . |
| 28 53 023 | 6/1979 | Germany . |
| 24 58 888 | 10/1985 | Germany . |
| 89 01 773 | 5/1990 | Germany . |
| 41 23 161 | 1/1993 | Germany . |
| 2 001 547 | 2/1979 | United Kingdom . |
| 2 079 174 | 1/1982 | United Kingdom . |
| 91/01178 | 2/1991 | WIPO . |

*Primary Examiner*—Christopher Kim
*Attorney, Agent, or Firm*—Herbert L. Lerner; Laurence A. Greenberg

[57] ABSTRACT

A plate-type catalytic converter includes a holder device and plates being coated with a catalytically active composition, being held one above the other in the holder device and extending in a main flow direction. The plates include first and second adjacent plates forming at least one reaction chamber. At least the first plate has an approximately corrugated first structure oriented obliquely relative to the main flow direction for deflecting a flow medium flowing along the first structure from the main flow direction.

6 Claims, 3 Drawing Sheets

PLATE-TYPE CATALYTIC CONVERTER

CROSS-REFERENCE TO RELATED APPLICATION

This application is a continuation of application Ser. No. 08/557,413, filed on Nov. 13, 1995 abandoned, which was a continuation of international application PCT/DE94/00476, filed Apr. 29, 1994.

BACKGROUND OF THE INVENTION

FIELD OF THE INVENTION

The invention relates to a plate-type catalytic converter, which includes a plurality of plates being disposed in a holder device and being coated with a catalytically active composition.

Such plate-type catalytic converters are used among other purposes for reducing nitrogen oxides contained in a gas mixture. The nitrogen oxides, together with a reducing agent, usually ammonia $NH_3$, which are introduced into the gas mixture beforehand, are converted into water and nitrogen through contact with the catalytically active composition by the process of selective catalytic reduction (SCR). The catalytically active composition with which the plates are coated on both sides usually includes titanium dioxide and one or more of the following additives: tungsten trioxide, molybdenum trioxide and vanadium pentoxide. Examples of catalysts of that kind can be found, for instance, in German Patent DE-PS 24 58 888.

A plate-type catalytic converter usually includes a so-called element case as a holder device for the plates that are coated with the catalytically active composition. The catalyst plates are inserted into the element case in such a way as to be spaced apart uniformly and oriented parallel to one another. The element case is usually in the form of a parallelepiped, which is open on the end surfaces. The end surfaces are the leading and trailing ends for a flow medium, such as the aforementioned gas mixture. The planes of the catalyst plates are oriented at right angles to the planes of the end surfaces. The main flow direction for the gas mixture is oriented parallel to the edges of the element case that join opposite end surfaces together.

A plurality of such element cases equipped with catalytically active plates are combined in a module, and a plurality of modules form one level of plate-type catalytic converters. For instance, a so-called $deNO_x$ system for reducing the nitrogen oxides in the flue gas from a combustion system typically has from 3 to 5 levels of such plate-type catalytic converters.

In order to space the plates apart in an element case, the plates typically have impressed beads, which extend parallel to the main flow direction and divide the space between two immediately adjacent plates into a plurality of subchambers. These subchambers experience a substantially laminar flow of the flow medium, so that as the flow distance through the plate-type catalytic converter increases, an increasingly less advantageous flow profile for the catalytic conversion, for instance of the nitrogen oxides with ammonia, develops in the subchambers, along with a gas distribution that is becoming less homogeneous, because of inadequate mixing of the components of the gas mixture.

In order to improve such turbulence, static mixers are already known that are disposed upstream of a plate-type catalytic converter in terms of the flow direction of the gas mixture and which disadvantageously take up a not inconsiderable length of the region of the wake of the mixture for making the components of the flow medium turbulent (see German Published, Non-Prosecuted Patent Application DE-OS 41 23 161). Catalysts are also known that are given a cross channel structure of the gas channels (subchambers) to attain high turbulence. Those catalysts, however, cause a relatively major pressure drop in a line for the flow medium, and in the case of gas mixtures which are heavily laden with dust and particles, they stop up relatively quickly.

Catalyst plates with openings and two tabs bent in opposite directions away from the applicable catalyst plate at each of the openings are also known from German Utility Model G 89 01 773.0. The tabs are shaped and dimensioned in such a way that they act as spacers from adjacent catalyst plates. The bending edges at which the tabs are bent away from the applicable catalyst are oriented parallel to the main flow direction, so as to hinder the flow as little as possible.

Especially for catalysts in motor vehicle exhaust systems, embodiments are also known in which catalyst layers, that are oriented parallel to the main flow direction of the exhaust gas and which by way of example include coated metal plates or bands that can also be rolled up into concentric tubes or spirals, are provided for mechanical reasons with spacer elements that lead to unavoidable turbulence in the exhaust gas flow. However, such turbulence fades relatively quickly and only causes a local disturbance to the flow, which otherwise has a laminar course.

SUMMARY OF THE INVENTION

It is accordingly an object of the invention to provide a plate-type catalytic converter, which overcomes the hereinafore-mentioned disadvantages of the heretofore-known devices of this general type and in which the catalytically active surface is utilized especially uniformly and intensively for catalytic conversion, for example of nitrogen oxides contained in a flue gas. It is desirable for the pressure drop to be as slight as possible and for plugging of the catalyst to be avoided as much as possible.

With the foregoing and other objects in view there is provided, in accordance with the invention, a plate-type catalytic converter, comprising a holder device; plates being coated with a catalytically active composition, being held one above the other in the holder device and extending in a main flow direction; the plates including first and second adjacent plates forming at least one reaction chamber; and at least the first plate having an approximately corrugated first structure oriented obliquely relative to the main flow direction for deflecting a flow medium flowing along the first structure from the main flow direction.

Each two of these plates which are immediately adjacent one another, together with the lateral boundary of the holder device, thus define a reaction chamber, which on the leading and trailing end is bounded by the holder device that allows the passage of the flow medium.

The wave crest pointing convexly out of the reaction chamber of one such corrugated structure accordingly creates a widening of the reaction chamber, the widening is oriented obliquely to the main flow direction, and the wave trough following this crest forms a narrowing of the reaction chamber, so that a constriction and expansion alternate constantly along the way from the inflow end to the outflow end. At the constrictions, the exhaust gas flow backs up and some of it is deflected into the crosswise expansions of the reaction chamber. As a result, a constantly repeated disruption of the exhaust gas flowing along the surface of the corrugated plate is attained, and the result is that it is virtually impossible for a laminar flow aimed directly from the inflow side to the outflow side to develop at this surface.

Instead, eddies develop at the constrictions and mix the flow medium within each reaction chamber in the wake of the constriction. If the plate parts at which the reaction chamber is narrowed and therefore at which the flow medium is partly deflected out of the main flow, also have apertures that lead to the next reaction chamber in succession, then a partial deflection of the flow medium into adjacent reaction chambers is also attained along with an additional turbulence in the components of the flow medium and a mass transfer between adjacent reaction chambers that encompasses the entire catalyst volume. In this way, the components contained in the flow medium, such as nitrogen oxides and ammonia, are especially well mixed together, and especially because of their turbulence are often carried along the surface of the catalyst plates. Since the flow medium is always only partially deflected from the main flow direction by these provisions, the result is a relatively slight pressure drop. Moreover, only very limited regions result in which dust and/or particles contained in the flow medium can be deposited. Therefore, the danger of stoppage of the catalyst remains quite low.

What is attained by the structure according to the invention is that as a result of its deflection, the flow medium in a reaction chamber is thoroughly mixed both locally and macro-scopically over the entire distance of the reaction chamber, and as a result, it is also attained that the components of the flow medium are carried especially frequently along the surface of the plates that are coated with the catalytically active composition. In this way, the likelihood of adsorption for the undesired components of the flow medium, such as nitrogen oxides in ammonia and a flue gas, is especially high. Especially for the catalytic conversion of nitrogen oxides with ammonia, the adsorption of the nitrogen oxides and ammonia is especially advantageous for the catalytic reaction thereof at the active centers of the catalytic composition. In this way, the Sherwood number which is a standard for a flow-induced contribution to the catalytic activity of the catalyst, remains at a virtually constant high level along the flow path, which causes the catalytic activity of the catalyst along the flow path to also be largely uniformly and intensively exploited. This is in flat contrast with previously conventional catalysts through which the flow was practically laminar and in which the Sherwood number drops along the flow path. This leads to high separation efficiency while at the same time the pressure loss is negligible.

According to a direct further development of the invention, a line which is formed by a wave trough and which determines the direction of the deflection forms an angle $\alpha$ with the main flow direction that is preferably between 20° and 160° C. The structure of a plate that is provided with apertures accordingly forms deflection elements which protrude from the plane of the plates and that are oriented relative to the main flow direction in such a way that in a region preceding these deflections elements and in the wake region thereof, local pressure differences in the flow medium are produced. These pressure differences dictate both turbulence in the flow medium in the same reaction chamber and mixing of the flow medium with portions of the flow medium from adjacent reaction chambers through the flow openings.

These deflection elements are preferably inclined relative to the plane of the plates by an angle of an inclination $\beta$, which is preferably between 10° and 60°, and they present impact surfaces to the flow medium that cause a high degree of turbulence because of their inclination and at the same time cause only a relatively slight pressure drop.

In accordance with a concomitant feature of the invention, a simple construction of the plate-type catalytic converter is obtained if the plate parts that act as deflection elements are spaced apart from one another. In this way, large catalytically active surfaces can be attained, relative to the total volume of the plate-type catalytic converter, by simply stacking the catalyst plates in the holder device, and preferably in an element case.

The corrugated structure of the plate can be formed by a corrugated profile, in the form of a sinusoidal curve. However, a rectangular or sawtooth oscillation or a combination of these forms is also possible. In principle, any structure that repeatedly deflects the flow medium from the main flow direction to turbulent flow paths is conceivable in this case.

Other features which are considered as characteristic for the invention are set forth in the appended claims.

Although the invention is illustrated and described herein as embodied in a plate-type catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
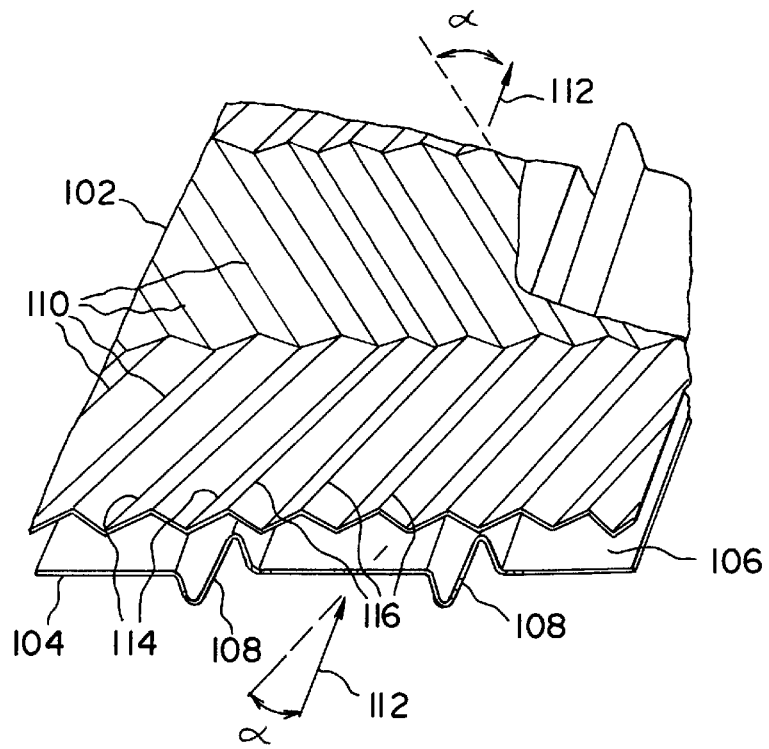
FIG. 1 is a fragmentary, diagrammatic, partially cut-away, perspective view of two stacked catalyst plates having a different structure.

Referring now in detail to the figures of the drawing, in which identical elements are identified by the same reference numerals, and first, particularly, to FIG. 1 thereof, there is seen a partially cut-away perspective view of two catalyst plates 102, 104 being disposed directly one above the other. The catalyst plates 102, 104, along with all subsequent catalyst plates in the other drawing figures, are coated on both sides with a catalytically active composition, which is not shown in further detail for the sake of simplicity. The catalyst plates 102, 104 define a reaction chamber 106, which is formed by a respective structure 108, 110 of the catalyst plates 104 and 102. Beads 108 are impressed into the catalyst plate 104 as a structure and extend parallel to a main flow direction 112 between two edges of the plate 104. A deflection of a flow medium, which flows into the reaction chamber 106 parallel to the main flow direction 112, is brought about essentially by the cross-channel-like structure 110 of the catalyst plate 102.

This cross-channel-like structure 110 includes depressions 114 ("wave troughs") and protrusions 116 ("wave crests"), which are oriented at an angle α of approximately 45° from the main flow direction 112. The depressions 114 and protrusions 116 extend between two edges of the plate 102, with multiple changes of direction of approximately 90° each time. This so-called open cross-channel structure is distinguished by good turbulence of the components of the flow medium and at the same time by a very slight pressure drop and a very slight danger of plugging from the particles and dust contained in the flow medium.

Figure 4:
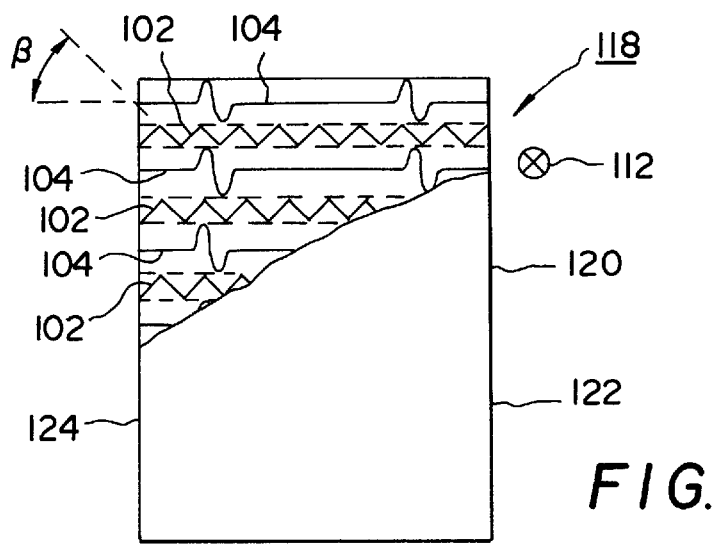
FIG. 4 is a partially cut-away plan view of a leading end of an element case in which the catalyst plates of FIGS. 1–3 are installed and stacked on one another.

A plate-type catalytic converter 118, as is shown in FIG. 4 in a plan view on its leading end, can be made simply by stacking the catalyst plates 102, 104 on one another in alternation. Due to the especially good turbulence of the flow medium which, for example, is a nitrogen-oxide-containing flue gas of a combustion system or an incineration system, the nitrogen oxides, along with ammonia introduced beforehand into the flue gas in such a plate-type catalytic converter 118, are carried especially frequently along the surface of the catalyst plates 102, 104 that are coated with the catalytically active composition. As a result, the likelihood of adsorption for the nitrogen oxides and the ammonia at the catalyst plates 102, 104 rises considerably as compared with plates having a laminar flow. The object of the invention is accordingly advantageously attained in this exemplary embodiment through the use of an alternating configuration of plates 104 having a structure 108 being solely parallel to the main flow direction 112 and plates 102 having a structure 110 that extends at the angle α from the main flow direction 112.

Figure 2:
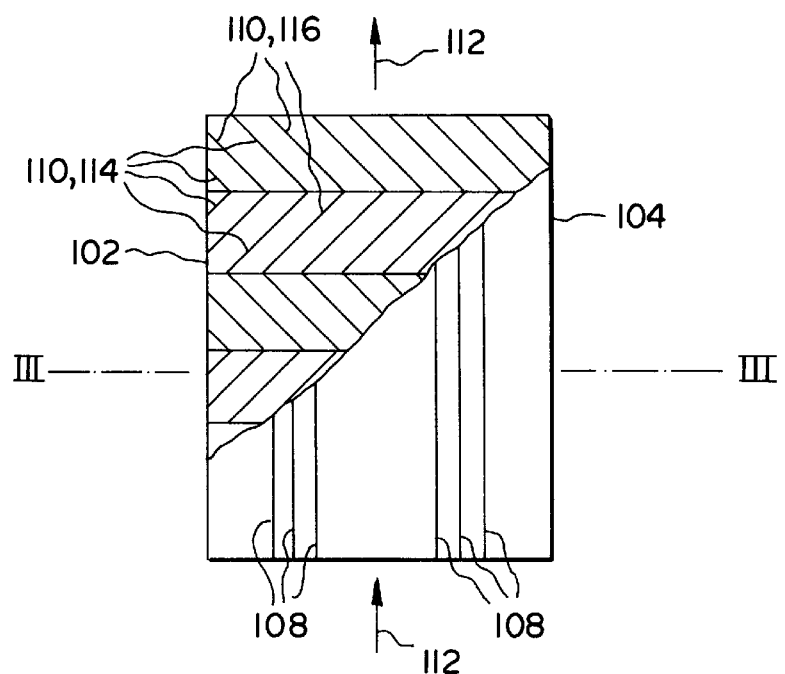
FIG. 2 is a partially cut-away plan view of the catalyst plates of FIG. 1.

FIG. 2 shows the catalyst plates 102, 104 of FIG. 1 in a partially cut-away plan view and once again illustrates the configuration of the structures 108, 110 relative to one another.

Figure 3:
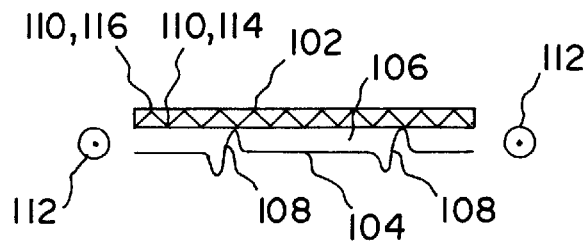
FIG. 3 is a sectional view taken along a line III—III of FIG. 2.

The section shown in FIG. 3, which is taken along the line III—III of FIG. 2, makes it clear that the catalyst plates 102, 104 are spaced apart in a simple and advantageous way through the use of their structures, or in other words the beads 108 and the protrusions and depressions 116 and 114, respectively. Moreover, as was already the case in FIG. 1, it is clearly shown that the reaction chamber 106 between the catalyst plates 102, 104 is not subdivided into individual subchambers, as is usual in the prior art with cross channels, but rather is a single chamber with only pointwise interruptions at the points of contact of the structures 108, 114.

FIG. 4 is a partially broken-away plan view on the leading end of the plate-type catalytic converter 118. This plate-type catalytic converter 118 includes the catalyst plates 102, 104 shown in FIGS. 1–3, which are stacked in alternation on one another and are built into an element case 120. In this exemplary embodiment, the element case 120 is formed of thin sheets of a stainless steel, and on its long sides 122, 124 it has non-illustrated guide rails for the catalyst plates 102, 104, which as a result can be simply slid into the element case. The deflection elements are preferably inclined relative to the plane of the plates by an angle of inclination β, which is preferably between 10° and 60°.

Figure 5:
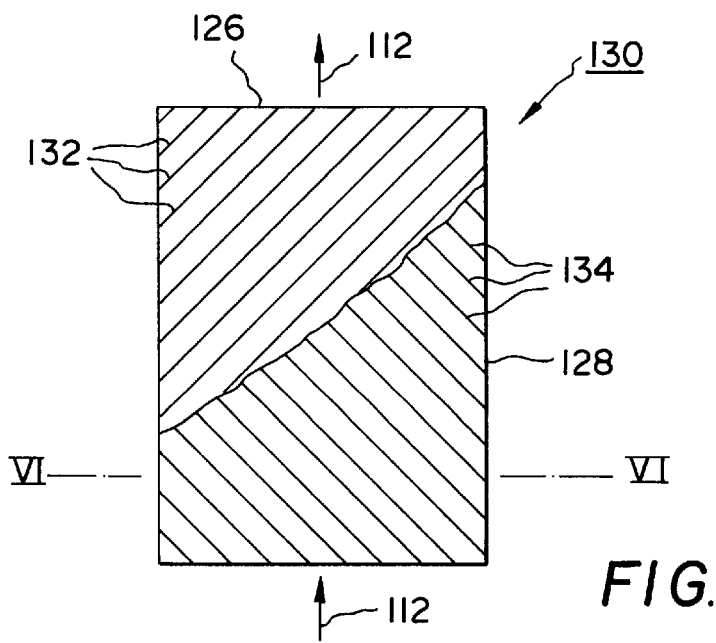
FIG. 5 is a partially cut-away plan view of two catalyst plates with an identical structure, in which the structures of immediately adjacent catalyst plates are disposed at an angle relative to one another.
Figure 6:
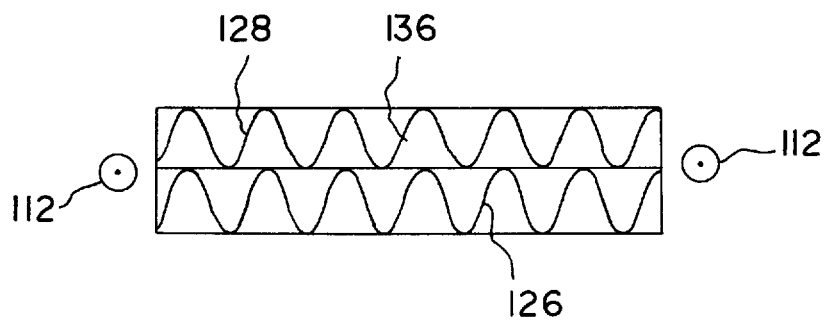
FIG. 6 is a sectional view through the catalyst plates, which is taken along a line VI—VI of FIG. 5.

FIG. 5 shows the way in which the concept of the invention can be realized with catalyst plates 126, 128 of a plate-type catalytic converter 130 if the structure of the catalyst plates is a corrugated profile, such as a sawtooth or a triangular profile, or a sinusoidal profile as is shown in the exemplary embodiment. Structures 132, 134 of the respective catalyst plates 126, 128 extend at an angle relative to the main flow direction 112, the directions of the structures intersect, and the structures 132, 134 extend without changing direction between two edges of the respective catalyst plates 126, 128. Each two catalyst plates 126, 128 which are shown uninstalled in FIG. 5 and are shown in an installed state in the element case 120 in FIG. 6, along with the side walls 122, 124 of the element case 120 shown in FIG. 4, define one reaction chamber 136. As in the previous exemplary embodiment as well, the reaction chamber 136 is extended over the entire space between two catalyst plates 126, 128, and is interrupted only pointwise at the points of contact of the catalyst plates 126, 128 that occur because of the structures 132, 134. Through the use of the structures 132, 134, the catalyst plates 126, 128 are also spaced apart from one another, as is best seen in FIG. 6, which shows a section taken along the line VI—VI of FIG. 5.

Due to the corrugated structures 132, 134, which extend at an angle relative to the main flow direction 112, a flow medium flowing into the reaction chamber 136 parallel to the main flow direction 112 is deflected from the main flow direction 112 and rendered turbulent. As a result, the separation rates for nitrogen oxides, for example, with ammonia are improved, on one hand as a result of a highly homogeneous distribution of the flow medium components, and on the other hand as a result of an increased adsorption likelihood for the nitrogen oxides contained in the flow medium along with the ammonia, as compared with plate-type catalytic converters having catalyst plates through which the flow is laminar. As a consequence, the catalytic activity of the plate-type catalytic converter 130 is increased over plate-type catalytic converters with a laminar flow through them, since the contribution to the catalytic activity of the catalytic converter, which is induced by the course of the flow, is increased.

Figure 7:
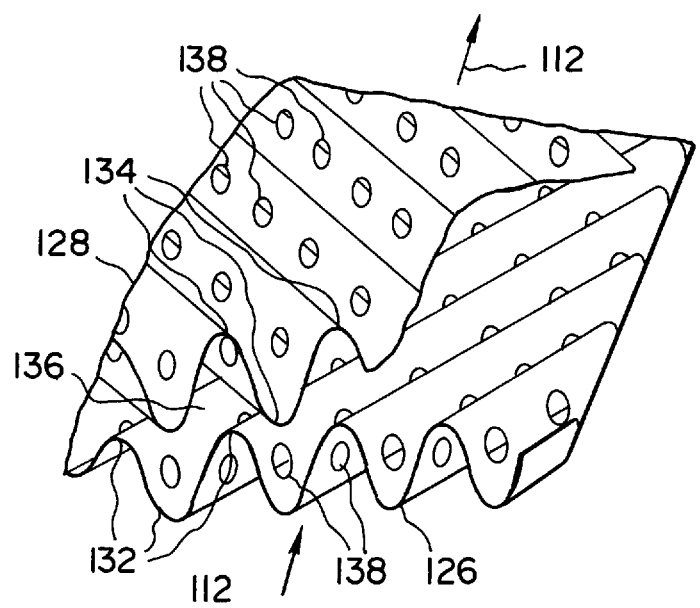
FIG. 7 is a fragmentary, partially cut-away view of two catalyst plates having an identical structure and a sinusoidal profile, in which the structures are disposed at right angles to one another, and apertures are provided on sloping edges of the sinusoidal profile.

The component of the catalytic activity that is induced by the course of the flow can be increased even further if, for example on the basis of a structure and a configuration of the catalyst plates 126, 128 relative to one another in generally flat elements, which are inclined relative to a main plate plane (in this case, the plane shown in FIG. 5) and the main flow direction 112, apertures 138 are provided, as is shown in a perspective, partially cut away view in FIG. 7. The apertures are constructed as holes 138 in the catalyst plates 126, 128, with each of the holes being disposed on sloping edges of the sinusoidal profile 132, 134. What is attained as a result is that the flow medium is not only deflected from the main flow direction 112 and thus mixed within the reaction chamber 136, but moreover it can at least partially enter adjacent reaction chambers (the non-illustrated reaction chambers in this case are disposed above the plate 128 and below the plate 126). Accordingly, the result of this feature is that not only are local differences in concentration from turbulence in the flow medium compensated for, but concentration differences that extend over the catalyst volume within an element case 120 can also be compensated for. The holes 138 may, for instance, also be constructed by forming tabs or lugs that are stamped out of the catalyst plates 126, 128 and protrude into the individual reactions chambers. The configuration of apertures 138 may be made in many ways. They may be disposed in both the rising and the falling sloping edge of the structure 132, 134, and they may also be offset from one another in the main flow direction 112.

As a consequence, the aforementioned turbulence of the components of the flow medium causes the individual components of the flow medium to be moved considerably more often along the catalytically active surfaces of the catalyst plates 102, 104. As a result, the likelihood of a three-way contact between the reagents, in this case the nitrogen oxides and the ammonia, for instance, and the active centers of the catalyst, is increased considerably as compared with catalyst plates that are known from the prior art and through which the flow is only laminar. The absorption of the nitrogen oxides and the ammonia at the catalytic material is especially advantageous because the nitrogen oxides together with the ammonia are converted at the catalytically active centers of the catalytically active layer of the catalyst plates into nitrogen and water.

Since the height of the structures is small as compared with the dimensions of the catalyst plates 102, 104, the pressure drop that is necessarily caused by the deflection of the flow medium from the main flow direction 112 also remains within tolerable values. The danger of stoppage of the reaction chambers, for instance from a flue gas that is heavily laden with particles and dust, can also be precluded, since because of the good microscopic turbulence of the flow medium, no dead spaces in the flow are created in the reaction chambers.

A plate-type catalytic converter which is constructed in the manner described herein attains substantially higher separation efficiency, at the same predetermined conditions, because of the flow deflection, as compared with plate-type catalytic converters through which the flow is virtually exclusively laminar. Conversely, at predetermined separation efficiency levels, this also permits the catalyst volume of a plate-type catalytic converter according to the invention to be chosen to be considerably smaller than that in a plate-type catalytic converter of the prior art through which the flow is virtually exclusively laminar.

We claim:

1. A plate-type catalytic converter, comprising:

a holder device; plates being coated with a catalytically active composition, being held one above the other in said holder device and extending along a main flow direction;

said plates including first and second adjacent plates forming at least one reaction chamber; and said first plate having a corrugated first structure formed of wave troughs and wave crests oriented obliquely relative to said main flow direction for deflecting a flow medium flowing along said first structure from said main flow direction; and said second plate having a second structure formed of wave troughs and wave crests oriented parallel to said main flow direction.

2. The plate-type catalytic converter according to claim 1, wherein said wave crests of said first structure extend obliquely along the entire first plate without a change of direction.

3. The plate-type catalytic converter according to claim 1, wherein said wave crests of said first structure have an orientation, as viewed in said main flow direction, in at least two different oblique directions.

4. The plate-type catalytic converter according to claim 1, wherein said first plate has plate parts at which the flow medium is deflected and apertures formed in said plate parts.

5. The plate-type catalytic converter according to claim 1, wherein said first and second plates are retained one above the other in alternation in said holder device.

6. The plate-type catalytic converter according to claim 1, wherein said plates are spaced apart from one another by said wave troughs and wave crests of said first and second structures.

* * * * *